Patented Mar. 16, 1954

2,672,396

UNITED STATES PATENT OFFICE 2,672,396

ERADICATION OF MARKS FROM REACTANT RECORD MATERIAL

David W. Steinhardt, Dayton, Ohio, assignor to The National Cash Register Company, Dayton, Ohio, a corporation of Maryland No Drawing. Application June 23, 1951, Serial No. 233,255

10 Claims. (Cl. 8—102)

This invention relates to a method of restoring used color-reactant record material for re-use, and more particularly pertains to record material, sensitized with an acid-like electron-acceptor adsorbent pigment, which has been discolored by adsorption thereon of a color-reactant organic compound which assumes a distinctive color upon coming into adsorption contact with the pigment.

As examples of the kind of sensitizing material with which the record material is made color-reactant, the following may be mentioned: attapulgite; sodium aluminum silicate zeolite material; sodium aluminum silicate zeolite material in which the base exchange sodium ions have been replaced by any of the ions which follow: nickel, copper, iron, zinc, mercury, barium, lead, cadmium or potassium; magnesium-trisilicate; pyrophillite; zirconium dioxide; and titanium dioxide. Such materials may be applied to a base web, such as paper, by the use of paper-coating binder material with the ratio of pigment to binder such that a large proportion of the active surface of the pigment is left exposed for contact by the applied color-reactant. Such sensitized record material is disclosed in the United States Letters Patent No. 2,548,364, which was issued on the application of Barrett K. Green and Robert W. Sandberg. As indicated in the patent, material suitable for applying such sensitizing pigment to the paper may be selected from such commonly used binders as paper-coating starch, casein, paper-coating latex made of butadiene-styrene-copolymer material, and the like.

The applied organic color-reactant materials useful for application to such sensitized record material, which will turn to a distinctive color when applied thereto, and which may be eradicated by this process, are of the class of organic double-bond aromatic electron-donor compounds, having diphenyl phthalide structures characterized by di-alkylamino auxochromic groups, which organic compounds are changed to a more highly polarized conjugated form, giving them a distinctive color, when adsorbed on the sensitized record material. The color reaction is an adsorbent surface chemical reaction.

Following are representative aromatic organic compounds, of the described class, listed with their structures:

(a) 3,3 bis(p - dimethylaminophenyl) - 6 dimethylamino phthalide, having the structure

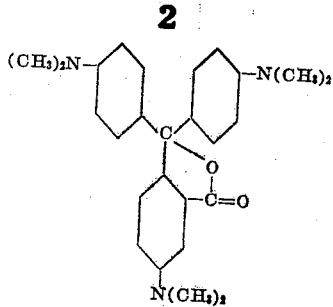

which may be called crystal violet lactone;

(b) 3,3 bis(p-di-n - butylaminophenyl) - 6 diethylamino phthalide, having the structure

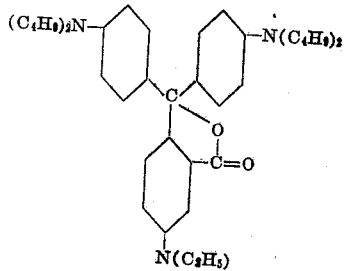

(c) 3,3 bis(p-diethylaminophenyl)-6 diethylamino phthalide, having the structure

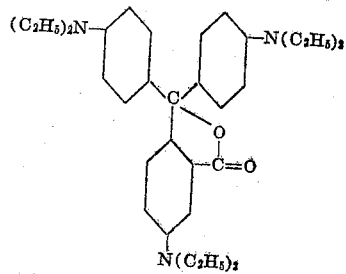

(d) 3,3 bis(p-dimethylaminophenyl) phthalide, having the structure

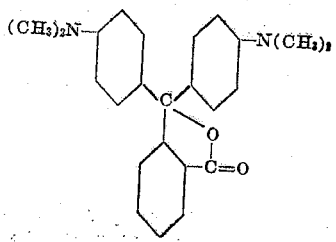

also called malachite green lactone;

(e) 3,3 bis(p-di-n-butylaminophenyl) phthalide, having the structure

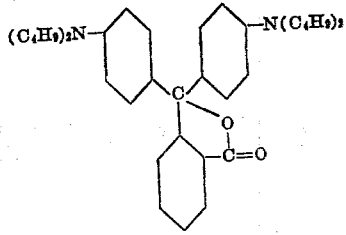

(f) 3,3 bis(p-di-n-propylaminophenyl) phthalide, having the structure

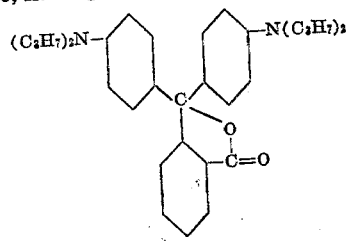

In brief, the method includes the step of applying to the colored mark a volatile fluid acid, strong enough as an electron-acceptor to react with the organic compound adsorbed on the surface of the pigment to form a salt with the auxochromic groups thereof, destroying the conjugated form of the compound, whereby the distinctive color disappears and the salt desorbs from the pigment, the excess fluid acid evaporating, leaving the record material dry and the adsorbent surfaces of the pigment chemically reactivated and capable of changing the color of additional organic color-reactant material applied thereto.

The action of the acid leaves the record material in its original sensitized condition, except for the residual salt formed at the points of application of the acid, but such salt is invisible, or indistinguishable from the remainder of the record material and does not interfere appreciably with the sensitivity of the regenerated area.

Inasmuch as it is not necessary to apply the acid in full strength, it is preferable to dissolve the acid in a more highly volatile medium so it will aid in the evaporation of the unused acid from the base web, the more highly volatile fluid acting to carrying the residual acid with it by entrainment. The volatile solvent is chosen so as to increase the acidic properties of the acid, thereby acting in a two-fold capacity.

Therefore, it is the principal object of the invention to provide a method of eradicating marks from and restoring the sensitivity of record material sensitized with acid-like pigment particles which cause a color to appear in certain organic aromatic compounds adsorbed thereon when transferred thereto by printing or writing operations, and which has been colored by such organic compounds.

A further object of the invention is to provide such a method in which a volatile acid is applied thereto to cause a salt to form destroying the color of and causing the desorption of the acid-treated organic color-reactant accompanied by evaporation of the residual acid.

Another object of the invention is to provide such a process in which the acid is dissolved in a more volatile solvent which makes the acid more effective and aids in the evaporation of it.

In a preferred embodiment of the invention two parts of glacial acetic acid is dissolved in 98 parts of acetone, by volume, such solution giving instantaneous decolorization of the area on the record material to which it is applied, and evaporating rapidly. The preferred solution is chosen because it has not an unpleasing odor, and is relatively inert toward paper, which latter is the most commonly used substance for forming the base record material. In the solution of glacial acetic acid and acetone, the glacial acetic acid may be used in as low a concentration as ¾ of one part to 99¼ parts of acetone, or as high as 50 parts of glacial acetic acid to 50 parts of acetone. The following may be substituted for acetic acid in the above formulation in equivalent concentration:

Propionic acid, butyric acid, ethylhexoic acid, concentrated hydrochloric acid, of 35% HCl, may be used with acetone up to about five parts of the hydrochloric acid to 95 parts acetone, by volume.

As substitutes for acetone may be mentioned methyl-ethyl-ketone and ethyl acetate.

It will be observed that all of the named organic color-reactant compounds have the common formula 3,3 bis(p-dialkylaminophenyl) phthalide or 3,3 bis(p-dialkylaminophenyl)-6 dialkylamino phthalide. The general structural formula for such compounds is as follows:

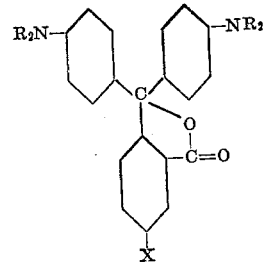

where R is a saturated alkyl group containing not more than four carbon atoms and where X, if present, may be a dialkylamino group, containing not more than 4 carbon atoms in an alkyl group.

In use, the solution may be applied to the marks, words, letters or characters it is desired to eradicate, by application thereto with a swab or dropper. It has been found that marking fluid "pencils," which have a barrel in the cavity in which the fluid is contained and which feeds such fluid to a felt stylus, are admirably adapted for the application of the novel fluid to paper, as in typewriting where the paper remains rolled around the supporting platen.

The invention is not to be deemed limited to the use of the named compounds where equivalents are operative as it is the formation of a salt of the color reactant with a volatile acid accompanied by its decolorization, desorption and rapid drying of the applied fluid which characterizes the process.

Reference is made to application Serial No. 233,256, filed by applicant on the same day with this application for a process used to restore the sensitivity of used sensitized record material of the class described where the colored marks have been made by compounds like those named herein but fortified with colorless dyestuffs which oxidize on application to the record material, with the passage of time, to a colored form.

What is claimed is:

1. A method of eradicating colored marks from record material sensitized with particles of an acid-like electron acceptor adsorbent pigment and upon which the colored marks were made by having physically and chemically adsorbed thereon an organic double-bond aromatic electron donor compounds having a diphenyl phthalide structure and characterized by having saturated dialkylamino auxochromic groups, which by such chemical adsorption is changed to a more highly polarized conjugated form accompanied by a change in color, and as an incident to said eradication, restoring the sensitivity of said record material at said points where formerly discolored, including the step of applying to said marks a volatile fluid composed of a fluid volatile acid dissolved in an organic solvent which is more highly volatile than the acid, said solvent being of a type which increases the acidity of the acid, said acid being strong enough as an electron acceptor to react with the organic compound to form a salt with the auxochromic groups thereof, destroying its color, whereby because of said salt formation the organic compound adsorbed chemically on the pigment desorbs therefrom, the excess fluid acid volatilizing, leaving the record material dry and the treated adsorbent surfaces of the pigment chemically active.

2. The method of claim 1, in which the acid is a volatile fluid aliphatic acid.

3. The method of claim 1 in which the volatile solvent is acetone.

4. The method of claim 1 in which the volatile solvent is methyl-ethyl-ketone.

5. The method of claim 1 in which the volatile solvent is ethyl acetate.

6. The method of claim 1, in which the acid is a volatile fluid aliphatic acid.

7. The method of claim 1, in which the record material has been colored with compounds selected from the group represented by the following structure

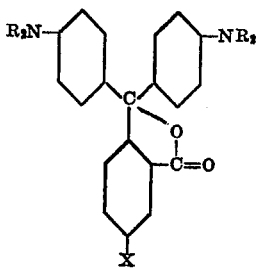

where R is a saturated alkyl group containing not more than four carbon atoms, and where X is taken from the group consisting of a hydrogen atom and a dialkylamino group of not more than eight carbon atoms.

8. The method of claim 1, in which the acid is selected from the group consisting of acetic, propionic, butyric, ethylhexoic, and hydrochloric acids.

9. The method of claim 1, in which the more highly volatile organic solvent fluid is selected from the group consisting of acetone, methyl-ethyl-ketone, and ethyl acetate.

10. The method of claim 8, in which the acid is dissolved in the solvent in amounts ranging from ¾ to 50 parts per hundred of solvent, by volume, the hydrochloric acid being used in not more than 5 parts per hundred of solvent, by volume.

DAVID W. STEINHARDT.

References Cited in the file of this patent

UNITED STATES PATENTS

| Number | Name | Date |
|---|---|---|
| 1,497,138 | Farrow | June 10, 1924 |
| 1,525,750 | Kocher | Feb. 10, 1925 |
| 2,524,811 | Koberlein | Oct. 10, 1950 |
| 2,548,364 | Green et al. | Apr. 10, 1951 |
| 2,548,366 | Green et al. | Apr. 10, 1951 |
| 2,550,467 | Green et al. | Apr. 24, 1951 |

FOREIGN PATENTS

| Number | Country | Date |
|---|---|---|
| 591,122 | Great Britain | Aug. 7, 1947 |

OTHER REFERENCES

Hauser et al.: "Color Reactions Between Clays and Amines," Journal American Chem. Soc., volume 62, July 1940, pages 1811 to 1814.